US 11,487,967 B2

(12) United States Patent
Bera et al.

(10) Patent No.: US 11,487,967 B2
(45) Date of Patent: Nov. 1, 2022

(54) FINETUNE IMAGE FEATURE EXTRACTION USING ENVIRONMENTAL DATA

(71) Applicant: International Business Machines Corporation, Armonk, NY (US)

(72) Inventors: Jhilam Bera, Bangalore (IN); Vijay Kumar Ananthapur Bache, Bangalore (IN); Rengia Ramaiyan Vasudevan, Bangalore (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 16/875,210

(22) Filed: May 15, 2020

(65) Prior Publication Data
US 2021/0357686 A1 Nov. 18, 2021

(51) Int. Cl.
| G06K 9/62 | (2022.01) |
| G06T 7/13 | (2017.01) |
| G06N 20/00 | (2019.01) |
| G06T 5/20 | (2006.01) |
| G06T 5/00 | (2006.01) |
| G06V 20/00 | (2022.01) |

(52) U.S. Cl.
CPC ......... *G06K 9/6256* (2013.01); *G06N 20/00* (2019.01); *G06T 5/003* (2013.01); *G06T 5/20* (2013.01); *G06T 7/13* (2017.01); *G06V 20/00* (2022.01)

(58) Field of Classification Search
CPC .... G06K 9/6256; G06K 9/00624; G06T 5/20; G06T 7/13; G06T 5/003; G06N 20/00
USPC ........................................ 382/159
See application file for complete search history.

(56) References Cited

U.S. PATENT DOCUMENTS

| 2015/0086131 A1* | 3/2015 | Wang ................. G06T 5/003 382/275 |
| 2019/0220698 A1* | 7/2019 | Pradeep ............... G06K 9/6293 |

FOREIGN PATENT DOCUMENTS

| CN | 101782976 A | * | 7/2010 |
| CN | 110210463 A | | 9/2019 |

OTHER PUBLICATIONS

Leung et al., "A Deep-Learning-Based Vehicle Detection Approach for Insufficient and Nighttime Illumination Conditions," MDPI, Applied Sciences, Nov. 8, 2019, 27 pages, https://www.mdpi.com/2076-3417/9/22/4769/pdf.

(Continued)

*Primary Examiner* — Ayodeji O Ayotunde
(74) *Attorney, Agent, or Firm* — Rachel M. Yadlosky

(57) ABSTRACT

A method, system, and computer program product for determining selection parameters for filtering algorithms using environmental data of images. The method may include receiving an image. The method may also include analyzing the image using at least image processing. The method may also include identifying, based on the analyzing, image data and environmental data of the image. The method may also include inputting the image data and the environmental data into a machine learning algorithm, where the machine learning algorithm includes mapped relationships between at least the environmental data and selection parameters. The method may also include predicting, using the machine learning algorithm, optimal selection parameters for the image. The method may also include applying the optimal selection parameters to a filtering algorithm for the image. The system and computer program product may include similar steps.

20 Claims, 9 Drawing Sheets

(56) References Cited

OTHER PUBLICATIONS

Ren et al., "Faster R-CNN: Towards Real-Time Object Detection with Region Proposal Networks," Arxiv, Jan. 6, 2016, 14 pages, https://arxiv.org/pdf/1506.01497.pdf.

Jiafa et al., "A scene recognition algorithm based on deep residual network," Systems Science & Control Engineering An Open Access Journal 7, Jul. 31, 2019, 26 pages, https://www.tandfonline.com/doi/pdf/10.1080/21642583.2019.1647576?needAccess=true.

Zhao et al., "Object Detection with Deep Learning: A Review," IEEE Transactions on Neural Networks and Learning Systems, vol. 30, Issue 11, Jan. 28, 2019, 26 pages, https://ieeexplore.ieee.org/document/8627998.

Uijlings et al., "Selective Search for Object Recognition," Technical Report 2012, submitted to IJCV, 14 pages https://ivi.fnwi.uva.nl/isis/publications/2013/UijlingsIJCV2013/UijlingsIJCV2013.pdf.

"OpenCV," Open source Computer Vision, Image Thresholding, Printed Feb. 3, 2020, 4 pages https://docs.opencv.org/3.4/d7/d4d/tutorial_py_thresholding.html.

Powell, "Image Kernels," Printed Feb. 3, 2020, 4 pages, http://setosa.io/ev/image-kernels/.

"Using Coloured Filters in Black and White Photography," PM, Printed Feb. 3, 2020, 10 pages https://www.photographymad.com/pages/view/using-coloured-filters-in-black-and-white-photography.

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

FINETUNE IMAGE FEATURE EXTRACTION USING ENVIRONMENTAL DATA

BACKGROUND

The present disclosure relates to image processing and, more specifically, to determining selection parameters for filtering algorithms using environmental data of images.

Image processing uses algorithms applied to a digital image in order to enhance the image, analyze the image, optimize characteristics of the image, etc. When processing an image, the pixels of the image may be represented in a matrix format. Processing an image may include filtering the image. Some example filters include edge detecting, sobel, blurring, sharpening, embossing, reducing Gaussian noise, etc. Through the filtering of the image, adaptive threshold value(s) may be determined and used to distinguish regions of interest (ROI) of the image. These regions of interest may feed into a neural network for classification and boundary box identification of the image.

SUMMARY

The present invention provides a computer-implemented method, system, and computer program product to determine selection parameters for filtering algorithms using environmental data of images. The method may include receiving an image. The method may also include analyzing the image using at least image processing. The method may also include identifying, based on the analyzing, image data and environmental data of the image. The method may also include inputting the image data and the environmental data into a machine learning algorithm, where the machine learning algorithm includes mapped relationships between at least the environmental data and selection parameters. The method may also include predicting, using the machine learning algorithm, optimal selection parameters for the image. The method may also include applying the optimal selection parameters to a filtering algorithm for the image. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
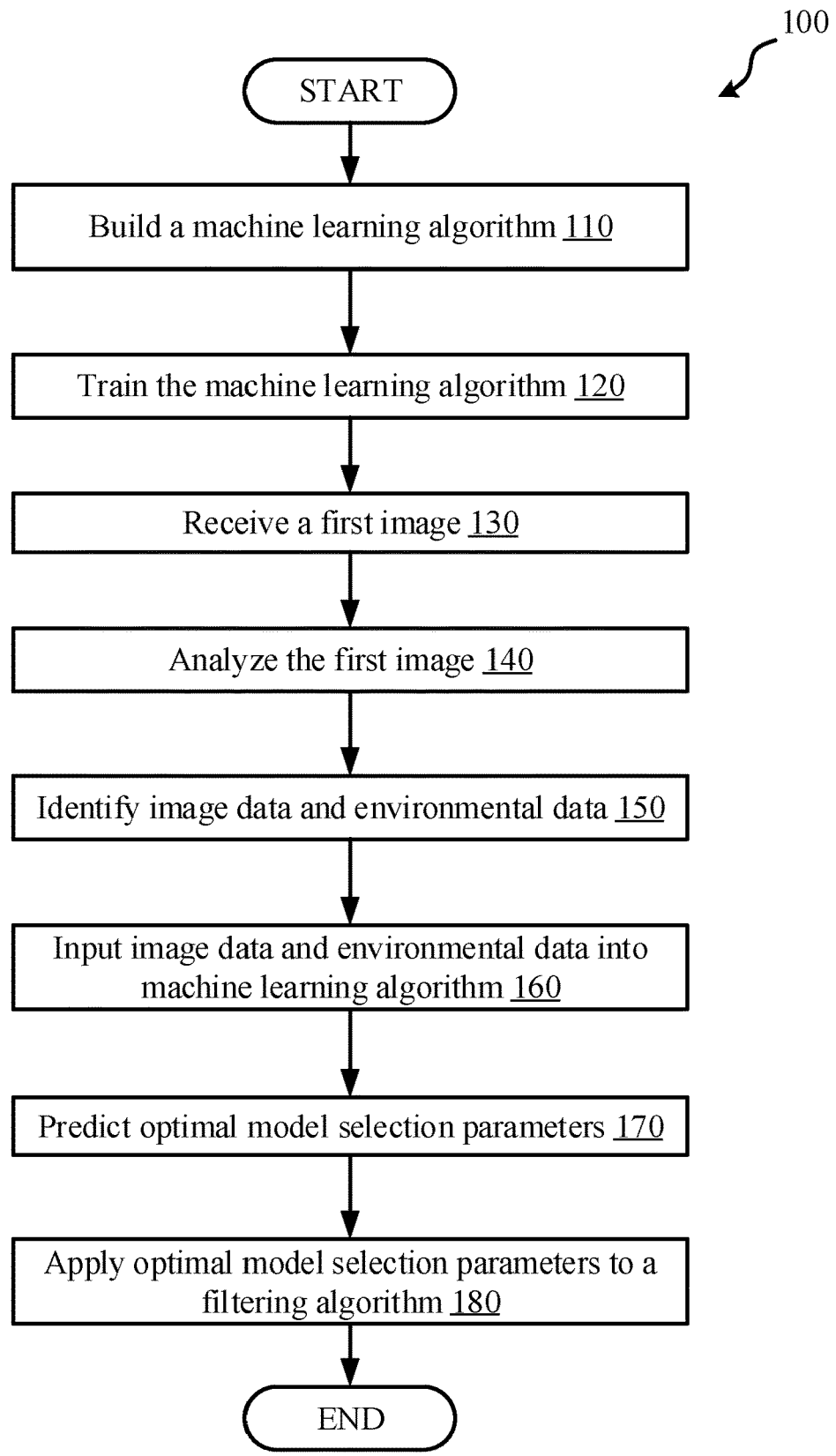
FIG. 1 depicts a flowchart of a set of operations for predicting selection parameters for filtering modules using environmental data of images, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to image processing and, more specifically, to determining selection parameters for filtering algorithms using environmental data of images. While the present disclosure is not necessarily limited to such applications, various aspects of the disclosure may be appreciated through a discussion of various examples using this context.

When identifying objects, bounding boxes may be drawn around the object, or objects, to help locate the objects in the image. In some instances, an image may have a plurality of bounding boxes representing different objects within the image. In conventional image processing, visual recognition algorithms are used to identify and recognize objects in images, and create bounding boxes to represent those objects. One example visual recognition algorithm is a convolutional neural network such as the R-CNN model (or its variants, such as Fast R-CNN and Faster R-CNN). The conventional R-CNN algorithm may identify objects accurately, but may take a longer time (i.e., may not be as efficient) in identifying and predicting the objects in the image. Another example visual recognition algorithm is You Only Look Once (YOLO) (and/or its variants, such as YOLOv2 and YOLOv3). YOLO may be fast at identifying objects in an image (for example, compared to R-CNN), but may not be quite as accurate. Further, YOLO may take an increased amount of time to recognize objects from long videos.

When processing an image, prior to image classification with a neural network, the image may be filtered and processed, and regions of interest may be identified. For instance, R-CNN may scan the image prior to inputting the image into a convolutional neural network, and by scanning the image prior to the convolutional neural network, only the important features of the image (e.g., regions of interest) may be fed into the convolutional neural network. In some embodiments, regions of interest may be areas, or regions, of an image that are determined to contain objects or features of interest. For example, if a portion of an image has a group of cars, these cars may be identified as a region, or regions, of interest as they may contain objects of the image. Additionally, prior to the regions of interest being identified, features may be captured and extracted in order to increase the accuracy of the image processing model (e.g., a visual recognition algorithm). The features may be desired portions or shapes in an image. However, the algorithm used to extract (or filter) these features may have been created with sample images. By creating the algorithm with simply a general pool of images, the algorithm may not be applicable to every image and situation, and even if applicable, the algorithm may not be very accurate in identifying the features. For example, an algorithm created to identify features in an image with natural light may not be efficient or accurate in identifying objects in ambient light and/or darker light (such as nighttime). Therefore, in conventional image processing, the general algorithm used to filter image features may not be very accurate and/or efficient, and may cause the image classification in the convolutional neural network to be less accurate, as the information fed into the image classification algorithm may not be accurate.

The present disclosure provides a computer-implemented method, system, and computer program product to determine selection parameters for filtering algorithms using environmental data of images. The image may be initially analyzed, or processed, in order to determine data such as image capture time, image location, and/or camera type. Additionally, environmental data of the image (such as object background, object ratio, image brightness, contrast value, image noise, filter type, and ambient conditions) may also be determined based on the image analysis. This data may be inputted into a machine learning algorithm and used to predict selection parameters that will be used in the filtering algorithm to filter the image and capture features of the image (which may help determine regions of interest of the image). In some embodiments, environmental data includes data relating to a surrounding environment of an image. The surrounding environment, in some instances, may be the overall environment of the image and/or the environment of the image that surrounds the main objects, or main focus, of the image. In some embodiments, environmental data includes data relating to at least the lighting (e.g., ambient and/or natural) of an image. The environmental data may further include, in some instances, data relating to the content (e.g., the background) of the image.

In some instances, the machine learning algorithm may be a supervised machine learning algorithm that is built using collected (for example, previously collected and stored) environmental data and image data, as well as collected image classification data from previous times images have been processed and classified on the system (for example, using conventional methods). The machine learning algorithm may include a classifier and/or classification model. The classifier may help predict outputs of the machine learning algorithm, which in this instance may be the selection parameters to be used in the filtering algorithm. In some instances, the supervised machine learning algorithm with the classifier may be a decision tree. Once the supervised machine learning algorithm has been sufficiently trained, the supervised learning capabilities may be removed and the machine learning algorithm may be a (unsupervised) machine learning model that automatically predicts the selection parameters.

Referring now to FIG. 1, a flowchart illustrating a method 100 for predicting selection parameters for filtering modules using environmental data of images is depicted, according to some embodiments. In some embodiments, method 100 is executed by a server (e.g., computer system/server 702 (FIG. 7)) on or connected to a computer system (e.g., computer system 200 (FIG. 2) and/or computer system 700 (FIG. 7)). In some embodiments, the method 100 is implemented as a computer script or computer program (e.g., computer executable code) to be executed on or connected to the computer system. In some embodiments, method 100 is executed on a device/system within a cloud computing environment (e.g., cloud computing environment 50 (FIG. 8)).

In some embodiments, method 100 includes operation 110 to build a machine learning algorithm. The machine learning algorithm may be used to determine and map relationships between at least the environmental data and selection parameters of a filtering algorithm or model. In some embodiments, the machine learning algorithm, at least initially, is a supervised machine learning model. Examples of environmental data includes data about the image such as object background, object ratio, image brightness, contrast value, image noise, filter type, and/or ambient conditions.

In some embodiments, building the machine learning algorithm includes receiving cloud environmental data and cloud selection parameters. Cloud environmental data may be environmental data that has been previously collected for other images (for example, images similar to the image received in operation 130). The cloud selection parameters may be selection parameters (for the filtering algorithm). As discussed herein, the filtering algorithm may filter the image and capture features of the image (which may then help determine regions of interest of the image). To filter the image and capture its features, one or more image filters may be applied to the image in order to better learn and identify the various contents of the image. Some example filters include edge detecting, sobel, blurring, sharpening, embossing, reducing Gaussian noise, etc. Each pixel of the image corresponds to a pixel value. These pixel values may be formatted in one or more matrices for the image. To apply the filters to the image, various parameters of the image such as the matrix dimensions (also referred to as a kernel dimension), the pixel values in the matrix (also referred to as a kernel), the scale of the image (for example, grayscale or red green blue (RGB) scale), etc. may be adjusted. These parameters are referred to herein as selection parameters.

In some embodiments, previous images received by the computer system were processed and filtered using conventional methods. The various data, including both data about the image (e.g., environmental data and image data) and the selection parameters used to filter the image, may be stored on the cloud. As discussed herein, these conventional selection parameters may be very general and may not accurately filter an image, which may result in less accurate regions of interest for the image classification process using a neural network. To build a machine learning algorithm for predicting optimal selection parameters for the filtering algorithm (i.e., selection parameters that accurately and efficiently filter the image), the previously stored cloud environmental data and cloud selection parameters may be requested and received from the cloud on which they were stored. The optimal selection parameters, as used herein, refers to the selection parameters outputted by the machine learning algorithm after it is trained. In some instances, the optimal selection parameters may be best fit parameters (i.e., parameters that are the best fit for the specific image based on the machine learning algorithm and the data gathered and used to train the machine learning algorithm). In some instances, the optimal selection parameters may be improved parameters (compared to conventional selection parameters) that are tailored to the specific image.

In some embodiments, once the cloud environmental data and the cloud selection parameters are received, they are organized in a structured format, such as a tabular format. Organizing the cloud environmental data and the cloud selection parameters (referred to collectively as the cloud data) into a structured format helps order the cloud data and makes it easier to determine relationships between the cloud environmental data and the cloud selection parameters.

In some embodiments, building the machine learning algorithm includes mapping the cloud environmental data to the cloud selection parameters. Mapping the data may include determining relationships between the cloud environmental data and the cloud selection parameters. For example, the environmental data for one image may indicate that the image has a large amount of natural light (for example, with an image capture time in the middle of the day and a low amount of ambient conditions). This environmental data may be mapped to the corresponding selection parameters that were used to filter the image. Continuing the example, another image may have environmental data (for example, with high ambient conditions and a lower image brightness) that indicates that the image was taken inside (in ambient lighting conditions) at nighttime. The environmental data for this image may be mapped to the corresponding selection parameters that were used to filter this image. Initially, before the machine learning algorithm has been trained, the selection parameters for each image may be very similar, or even the same, regardless of the image's specific environmental data and image data. This is because the conventional parameter identification process may not consider the specific environmental conditions and data of each image. Once the machine learning algorithm is trained, the selection parameters mapped to the various environmental data may become more fine-tuned and tailored to the specific environmental data/conditions.

Figure 3:
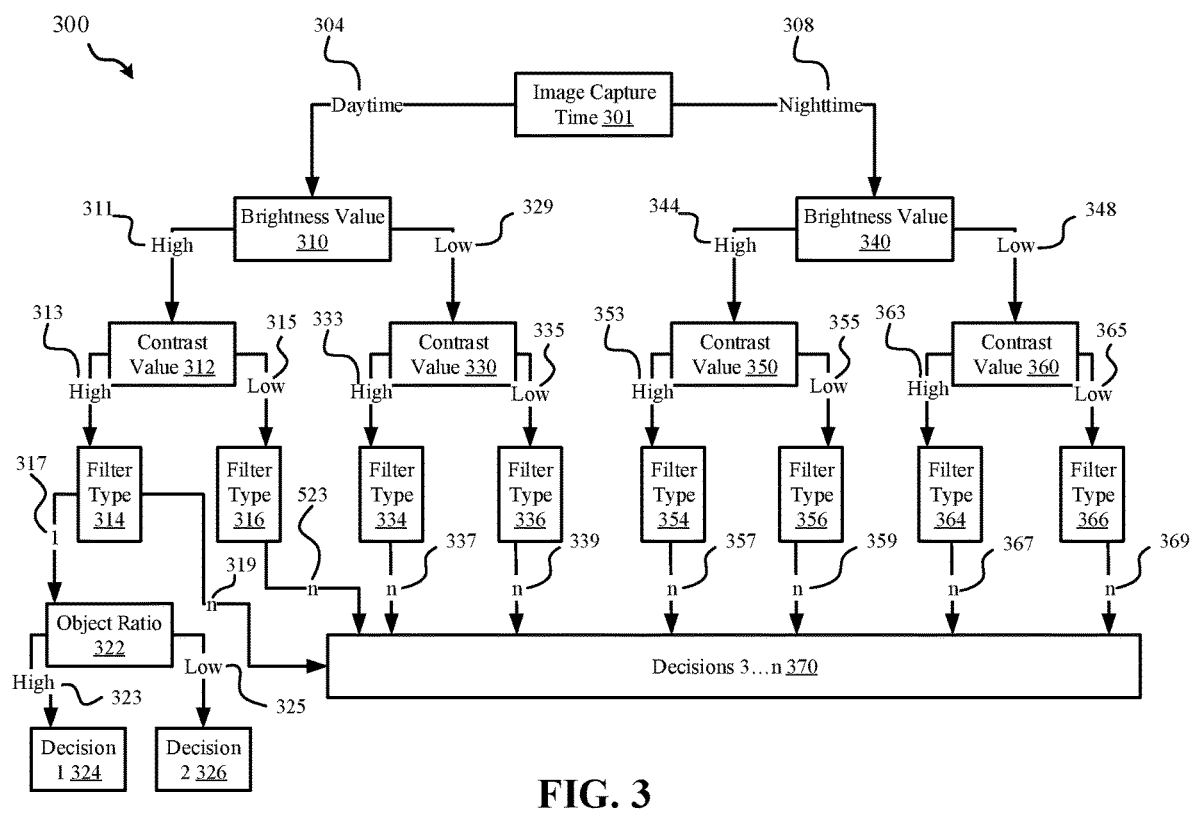
FIG. 3 depicts a schematic diagram of an example machine learning decision tree to predict selection parameters for image processing, according to some embodiments.

In some embodiments, building the machine learning algorithm further comprises creating the machine learning algorithm using the cloud environmental data (for example, the mapped cloud environmental data) as pre-training data. The pre-training data may be data that is initially used to create, or build, the machine learning algorithm before the algorithm has been further trained and adjusted (based on the training). In some embodiments, the machine learning algorithm includes a classifier (or a classification model). In some embodiments, the machine learning algorithm (with the classifier) is a decision tree, for example decision tree 300 (FIG. 3).

In some embodiments, method 100 includes operation 120 to train the machine learning algorithm. Training the machine learning algorithm uses supervised learning, in various embodiments. In some embodiments, training the machine learning algorithm includes organizing the environmental data and the image data (for the images used to train the algorithm) into a structured format such as a tabular format. In some instances, a plurality of other images are received by the computer system (prior to receiving the image in operation 130, discussed herein), and those plurality of other images are analyzed and the image data and environmental data for the plurality of other images are determined. In some embodiments, the image data and environmental data for the plurality of other images may be organized into a structured format.

In some embodiments, the environmental data and the image data for the plurality of other images (for instance, once in the structured format) may be inputted into the machine learning algorithm as training data. The machine learning algorithm may train itself (for example, using supervised learning) based on the various environmental data and image data. Once the machine learning algorithm begins training, the determined selection parameters (determined using the machine learning algorithm) should become more customized/tailored to different environmental data and image data.

Method 100 includes operation 130 to receive an image. In some embodiments, an image is received when it is uploaded and stored (e.g., saved). In some embodiments, an image may be received when it is digitized onto the computer system. In some instances, receiving an image includes any method of obtaining the image on the computer system. In some embodiments, the image is represented by a set of pixels such as a matrix of pixel values.

Method 100 includes operation 140 to analyze the image and operation 150 to identify the image data and environmental data of the image (based on the analyzing). Once the image has been received, it may go through an initial image processing analysis to identify data about the image. In some instances, analyzing the image includes collecting metadata of the image file. Metadata of the image may include information relevant to the image and its production. The metadata may be embedded into the file and/or in a file associated with the image file. In some instances, the metadata may be generated by the device that captured the image. In some instances, the metadata may be added manually. Image data such as image capture time, image location, and/or camera type can be gathered from the image file metadata. Other data about the image may be gathered using a software framework such as Open source computer vision (OpenCV). In some instances, the framework may gather/determine environmental data about the image such as object background, object ratio, image brightness, contrast value, image noise, filter type, and/or ambient conditions. Environmental data may include any data that relates to the surroundings and conditions of the image. One primary piece of environmental data may be the lighting conditions of the image, such as whether the image contains ambient light, natural light, or both, whether the image contains contrasting lighting/shading (e.g., some of the picture is very dark, some is very light), etc. Data such as the image brightness, contrast value, ambient conditions, etc. may help determine the lighting of the image.

The order of operations depicted in FIG. 1 is an exemplary order of operations. In some instances, operation 150 may occur before the machine learning algorithm has been trained (in operation 120) but after it has been built (in operation 110) (for example, if the machine learning algorithm is still being trained). In some instances, operations 140 and 150 may occur before operations 110 and 120.

In some embodiments, if the environmental data and the image data (from operations 140 and 150) are being used to train the machine learning algorithm, then training the machine learning algorithm (e.g., in operation 120) may include inputting the environmental data and the image data into the machine learning algorithm as training data.

Method 100 includes operation 160 to input image data and environmental data into a machine learning algorithm. Once an image has been received by the computer system and the image data and environmental data have been identified, the image data and the environmental data may be inputted into the machine learning algorithm in order to help predict selection parameters for the specific image. In some embodiments, the image data and the environmental data may be inputted into the machine learning algorithm while it is still being trained (therefore the image data and the environmental data may be training data, in this instance). In some embodiments, the image data and the environmental data are inputted into the machine learning algorithm once it has already been trained. As discussed herein, the machine learning algorithm may map relationships between at least the environmental data and selection parameters. Therefore, when the image data and the environmental data are inputted into the machine learning algorithm, the machine learning algorithm may output predicted selection parameters (e.g., optimal selection parameters, discussed herein).

Method 100 includes operation 170 to predict optimal selection parameters. Once the image data and the environmental data are inputted into the machine learning algorithm, the machine learning algorithm (for example, a supervised learning algorithm) predicts (and outputs) optimal selection parameters. The optimal selection parameters may be the selection parameters outputted by the machine learning algorithm. In some instances, optimal selection parameters may be the selection parameters that best fit the specific environmental data and image data of the specific image based on prior training data. In some instances, the optimal selection parameters may be improved parameters (compared to conventional selection parameters) that are tailored to the specific image. Examples of optimal selection parameters are discussed further herein and depicted in FIGS. 3-5. Selection parameters include one or more of hyper-parameters for image processing, filter selection, image kernel dimension values, etc. For instance, the selection parameters may include the matrix dimensions (also referred to as a kernel dimension), the pixel values in the matrix (also referred to as a kernel), the scale of the image (for example, grayscale or red green blue (RGB) scale), etc.

Method 100 includes operation 180 to apply optimal selection parameters to the filtering algorithm. The filtering algorithm may be a conventional filtering algorithm such as what is included in YOLO (or its variations) and/or R-CNN (or its variations). By applying the predicted optimal selection parameters to the filtering algorithm, conventional filtering algorithms will more accurately (and in some instances, more efficiently) filter the image in order to help classify the image and identify objects within the image. Some example filters include edge detecting, sobel, blurring, sharpening, embossing, reducing Gaussian noise, etc. As discussed herein, through the filtering of the image, adaptive threshold value(s) may be determined and used to distinguish regions of interest (ROI) of the image. These regions of interest may feed into a neural network for classification and boundary box identification of the image.

In some embodiments, once the machine learning algorithm has been sufficiently trained, the machine learning algorithm may no longer need to be a supervised learning model. In some embodiments, determining whether the machined learning algorithm is sufficiently trained includes determining an accuracy of the optimal selection parameters (predicted using the machine learning algorithm). Determining an accuracy of the optimal selection parameters may include analyzing the effectiveness of the filtering mechanism with the current predicted optimal selection parameters compared to the effectiveness of the filtering mechanism with older predicted selection parameters, and maybe even the initial predicted selection parameters. In some instances, the accuracy of the optimal selection parameters is represented by a decimal, a percentage, a numerical value, a category (e.g., very accurate, accurate, slightly accurate, not accurate, etc.), etc.

In some embodiments, determining whether the machine learning algorithm is sufficiently trained further includes determining whether the accuracy of the optimal selection parameters is above a threshold accuracy value. In some instances, the threshold accuracy value may be predetermined by the user and/or client of the computer system. In some instances, the threshold accuracy value may be determined using supervised learning. If the accuracy of the optimal selection parameters is above the threshold accuracy value, the machine learning algorithm may be classified as sufficiently trained, and the supervised learning capabilities may be removed from the machine learning algorithm. Therefore, in some instances, the machine learning algorithm is a supervised machine learning algorithm. In some instances, for example once the supervised learning capabilities are removed, the machine learning algorithm may be an unsupervised machine learning algorithm that automatically predicts the optimal selection parameters.

Figure 2:
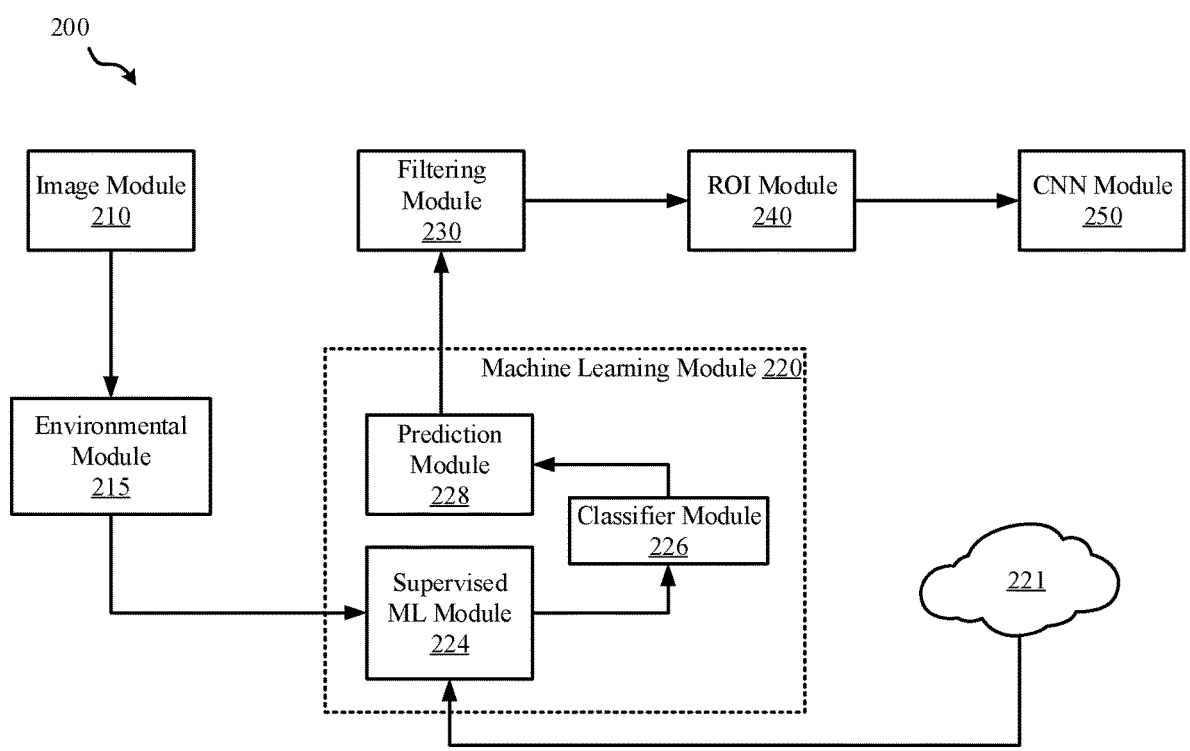
FIG. 2 depicts a schematic diagram of an example image detection environment, according to some embodiments.

Referring to FIG. 2, a schematic diagram of an example image detection computer system 200 is depicted, according to some embodiments. Image detection system 200 includes an image module 210, an environmental module 215, a machine learning module 220, a filtering module 230, a regions of interest (ROI) module 240, and a convolutional neural network (CNN) module 250. In some embodiments, image module 210 performs at least operation 130 (FIG. 1), environmental module 215 performs at least operation 140 (FIG. 1), machine learning module 220 performs at least operations 110-120 and 150-170 (FIG. 1), and filtering module 230 performs at least operation 180 (FIG. 1). Once the predicted optimal selection parameters have been applied to the filtering algorithm in filtering module 230, the computer system 200 may use conventional methods to determine regions of interest in ROI module 240 and to perform image classification in CNN module 250.

In some embodiments, machine learning module 220 includes a supervised machine learning (ML) module 224, a classifier module 226, and a prediction module 228. In some instances, the supervised ML module 224 performs the building and training of the machine learning algorithm, the classifier module 226 classifies the specific image data and environmental data for the image, and the prediction module 228 predicts the optimal selection parameters for the image.

Figure 8:
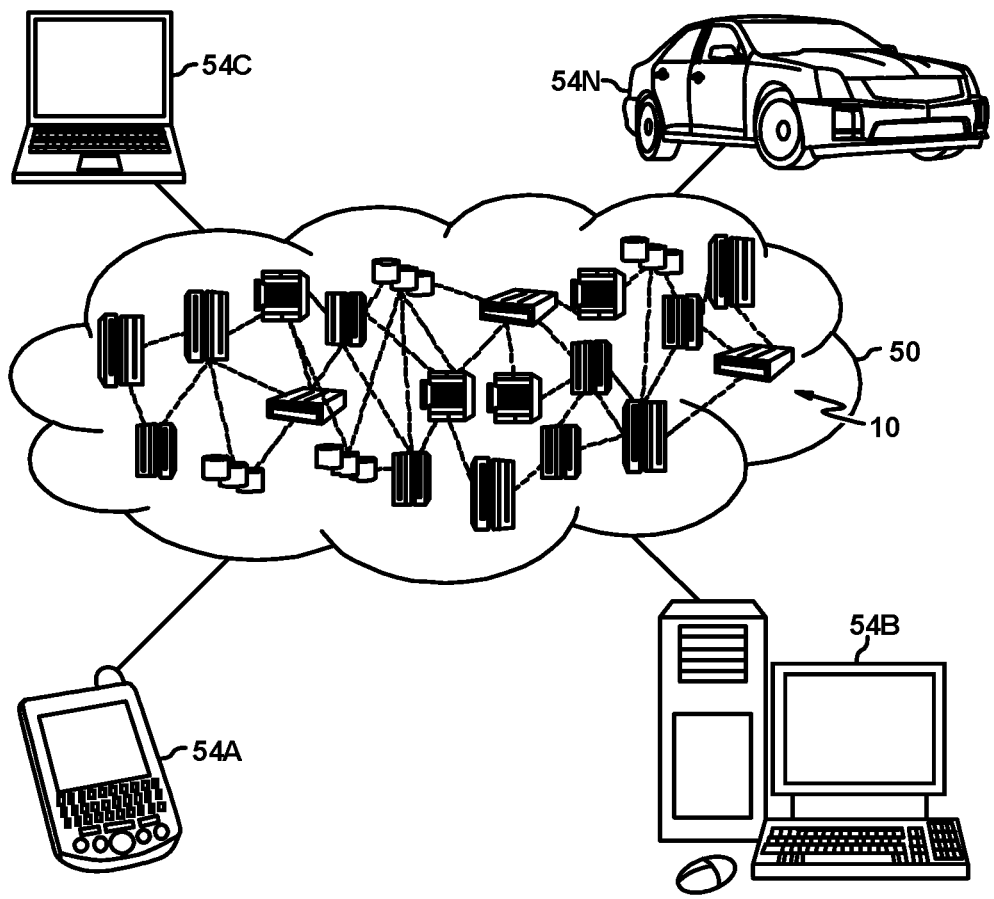
FIG. 8 depicts a cloud computing environment, according to some embodiments.

In some embodiments, image detection computer system 200 further comprises cloud environment 221. In some instances, cloud environment 221 corresponds with cloud environment 50 (FIG. 8). The cloud environment 221 may store cloud image data and cloud environmental data from previously processed images, and may transmit this data to the supervised ML module 224. In some embodiments, the image data and environmental data for the image currently being processed will be stored in cloud environment 221.

Referring to FIG. 3, a schematic diagram of an example machine learning decision tree 300 for predicting selection parameters for image processing is depicted, according to some embodiments. Machine learning decision tree 300 is an example machine learning algorithm used to predict the optimal selection parameters for the image. The machine learning decision tree 300 reviews the image data and the environmental data of the specific image, and makes decisions based on the data.

Decision tree 300 starts with reviewing the image capture time 301 of the image (which is part of the image data of the image). If it is determined that the image capture time 301 was in the daytime 304, the decision tree proceeds to reviewing the brightness value 310 of the image (which is part of the environmental data of the image). In this decision tree 300, the brightness value 310 can be either high 311 or low 329. If the brightness value 310 is determined to be high 311, the decision tree 300 proceeds to reviewing the contrast value 312 of the image. Contrast value 312 can be either high 313 or low 315. Further, if the contrast value 312 is determined to be high 313, the decision tree 300 proceeds to determining the filter type 314 of the image. In this example decision tree 300, the filter type can be either filter type 1 317 or filter type n 319. If the filter type 314 is determined to be filter type 1 317, the decision tree 300 proceeds to determining the object ratio 322. The object ratio 322 can be either high 323 or low 325. If the object ratio 322 of the image is determined to be high 323, then decision 1 324 is outputted from the decision tree 300. Decision 1 324 are optimal selection parameters for the image, in some embodiments. If it is determined that the object ratio 322 is low 325, then decision 2 326 is outputted from the decision tree 326. Decision 1 324 and decision 2 326 are further discussed herein and are depicted in FIG. 4.

Decision tree 300 includes other determinations that could have been made throughout the decision tree 300. For instance, if, when determining the filter type 314 of the image, it is determined that the filter type 314 is filter type n 319, then the decision tree proceeds to a decision 3 through decision n 370. Similarly, if, when determining the contrast value 312, the contrast value 312 is determined to be low 315, then decision tree 300 proceeds with determining filter type 316 as filter type n 323 and makes a decisions 3 through n 370. Decisions 3 through n 370 includes any other possible decisions that can be made from decision tree 300. Decisions 3 through n 370 are illustrated herein with one block for the sake of understanding and convenience. In practice, each determination path taken through decision tree 300 may conclude with a separate decision, and thus decision block.

If it was determined that the brightness value 310 of the image was low 329, then the decision tree proceeds to determining the contrast value 330. Similarly, if it was determined that the image capture time 301 was in nighttime 308, decision tree 300 proceeds to determining brightness value 340. The brightness value 340 may be either high 344 or low 348 and may proceed to either determining contrast value 350 or contrast value 360, respectively. Contrast value 330, 350, and 360 can either be high 333, 353, and 363 or low 335, 355, and 365, respectively. Then the decision tree will proceed to either filter type 334, 336, 354, 356, 364, or 366, depending on the results of the contrast value 330, 350, and 360. In the interest of space, only one option for each filter type 334, 336, 354, 356, 364, and 366 was depicted, filter type n 337, 339, 357, 359, 367, and 369 (respectively). There may be other options for various boxes in the decision tree, but for simplicity's sake, only certain options were depicted. In decision tree 300, for each filter type n 337, 339, 357, 359, 367, and 369, a decision 3 through n 370 is made.

Figure 4:
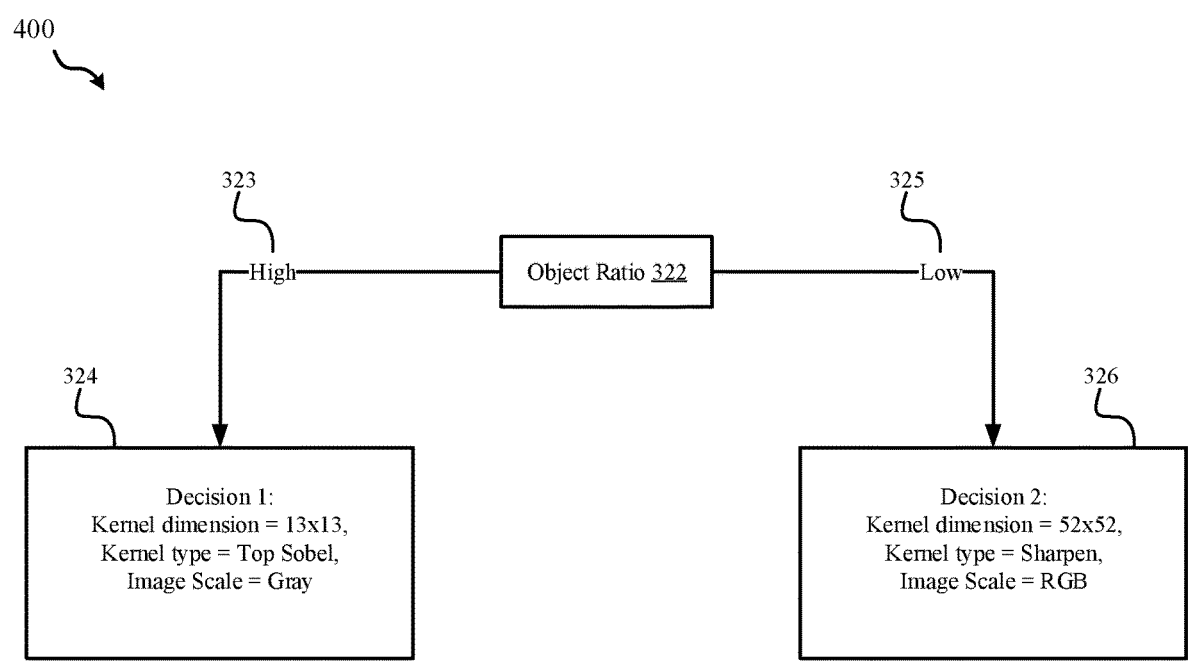
FIG. 4 depicts a schematic diagram of example predictions of the decision tree, according to some embodiments.

Referring to FIG. 4, a schematic diagram of example predictions 400 of the decision tree is depicted, according to some embodiments. FIG. 4 includes a more detailed version of decision 1 324 and decision 2 326 from FIG. 3. As depicted in FIG. 3, if it is determined that the object ratio 322 is high 323, then decision 1 324 is outputted from the decision tree 300. Decision 1 324 includes optimal selection parameters kernel dimension, kernel type, and image scale. In decision 1 324, the optimal kernel dimension is determined to be 13×13, the kernel type is determined to be top sobel, and the image scale is determined to be gray. In some instances, decision 1 324 are the optimal selection parameters predicted in operation 170 (FIG. 1).

If it is determined that the object ratio 322 is low 325, then decision 2 326 is outputted from the decision tree 300. Decision 2 326 includes a kernel dimension 52×52, a kernel type of sharpen, and an image scale of red green blue (RGB). In some instances, decision 2 326 are the optimal selection parameters predicted in operation 170 (FIG. 1).

Figure 5:
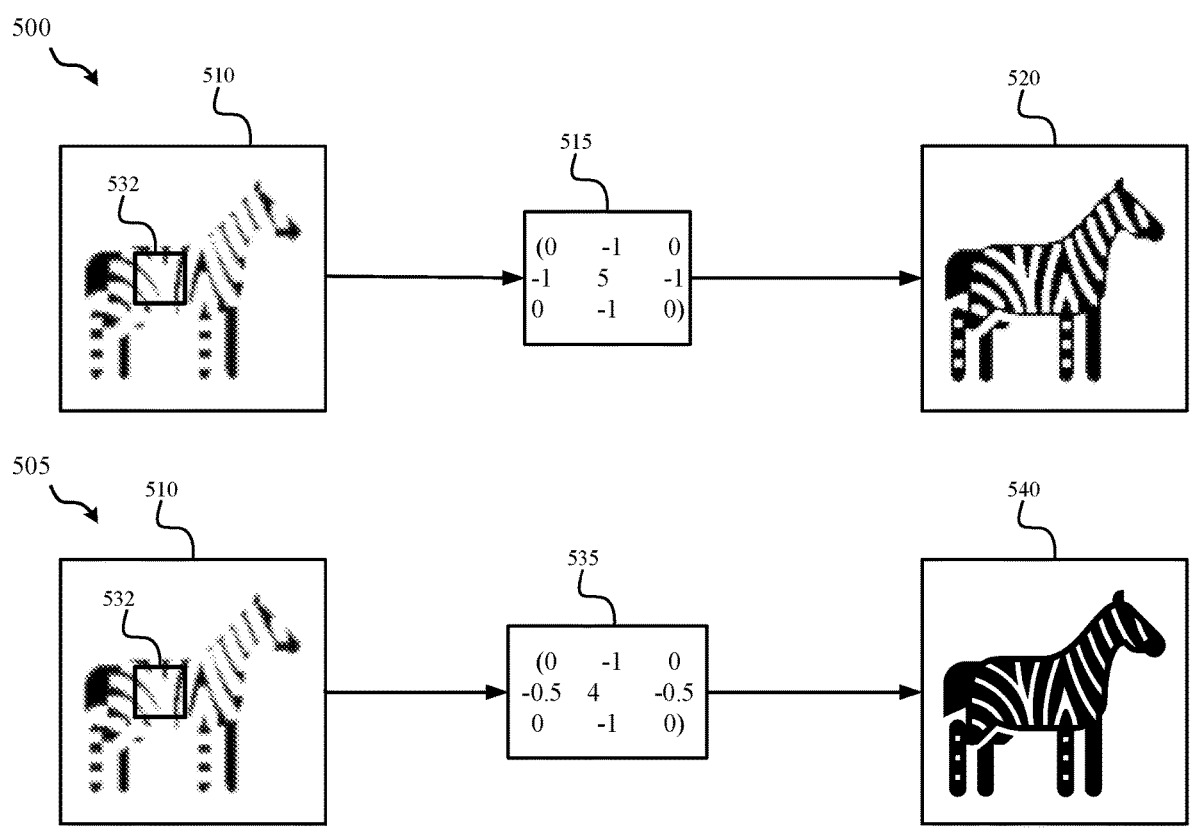
FIG. 5 depicts a schematic diagram of images filtered with a sharpening algorithm using conventional parameters and the predicted selection parameters, according to some embodiments.

Referring to FIG. 5, a schematic diagram of a first example image 500 filtered with a sharpening algorithm using conventional parameters and a second example image 505 filtered with a sharpening algorithm using the predicted selection parameters is depicted, according to some embodiments. For both example images 500 and 505, the original image to be filtered (in this instance, sharpened) is image 510. In some embodiments, only a selected area 532 of the image 510 is being sharpened. Other filtering algorithms may also be applied to the image 510 during the execution of the filtering algorithm(s), but for simplicity sake, only a sharpening algorithm is depicted for example images 500 and 505. For the first example image 500, conventional selection parameters 515 are applied to image 510. These conventional selection parameters 515 include the size of the matrix and the values of the matrix. When the conventional selection parameters 515 are applied to the image, the image may be sharpened to image 520.

For the second example image 505, the optimal selection parameters 535 (for example, as determined in FIG. 1) are applied to image 510. In this example, the optimal selection parameters 535 include a matrix size of 3×3, which is the same as the conventional selection parameters 515, and matrix values of 0, −1, 0, −0.5, 4, −0.5, 0, −1, 0. These matrix (or kernel) values are different than the matrix values of the conventional selection parameters 515. With the optimal selection parameters 535, the image 510 is sharpened to image 540, which is much sharper than the sharpened image 520, done using the conventional selection parameters.

Figure 6:
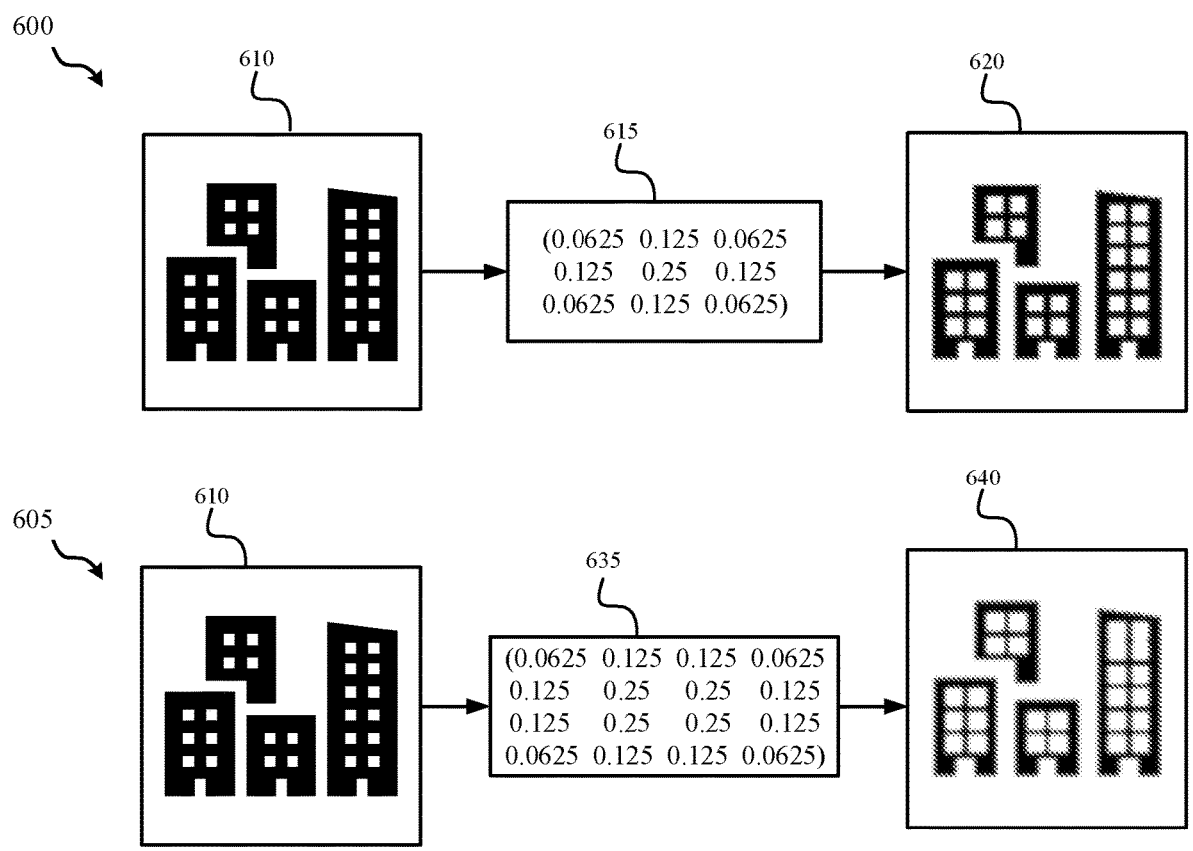
FIG. 6 depicts a schematic diagram of images filtered with a blurring algorithm using conventional parameters and the predicted selection parameters, according to some embodiments.

Referring to FIG. 6, a schematic diagram of a first example image 600 filtered with a blurring algorithm using conventional parameters and a second example image 605 filtered with a blurring algorithm using the predicted selection parameters is depicted, according to some embodiments. For both example images 600 and 605, the original image to be filtered (which, in this example, involves blurring the image) is image 610. Other filtering algorithms may also be applied to image 610 during the execution of the filtering algorithm(s), but for simplicity sake, only a blurring algorithm is depicted in these example images 600. For the first example image 600, conventional selection parameters 615 are applied to the image 610. These conventional selection parameters include the size of the matrix (3×3) and the values of the matrix. When the conventional selection parameters 615 are applied to the image 610, the image may be blurred to image 620.

For the second example image 605, the optimal selection parameters 635 (for example, as determined in FIG. 1) are applied to image 610. In this example, the optimal selection parameters 635 include a matrix size of 4×4, which is larger than the conventional selection parameters 615, and matrix values that are similar to the conventional selection parameters 615, but with an extra column of values. With the optimal selection parameters 635, the image 610 is blurred to image 640, which has an increased blurriness compared to the blurred image 620, done using the conventional selection parameters 615.

Figure 7:
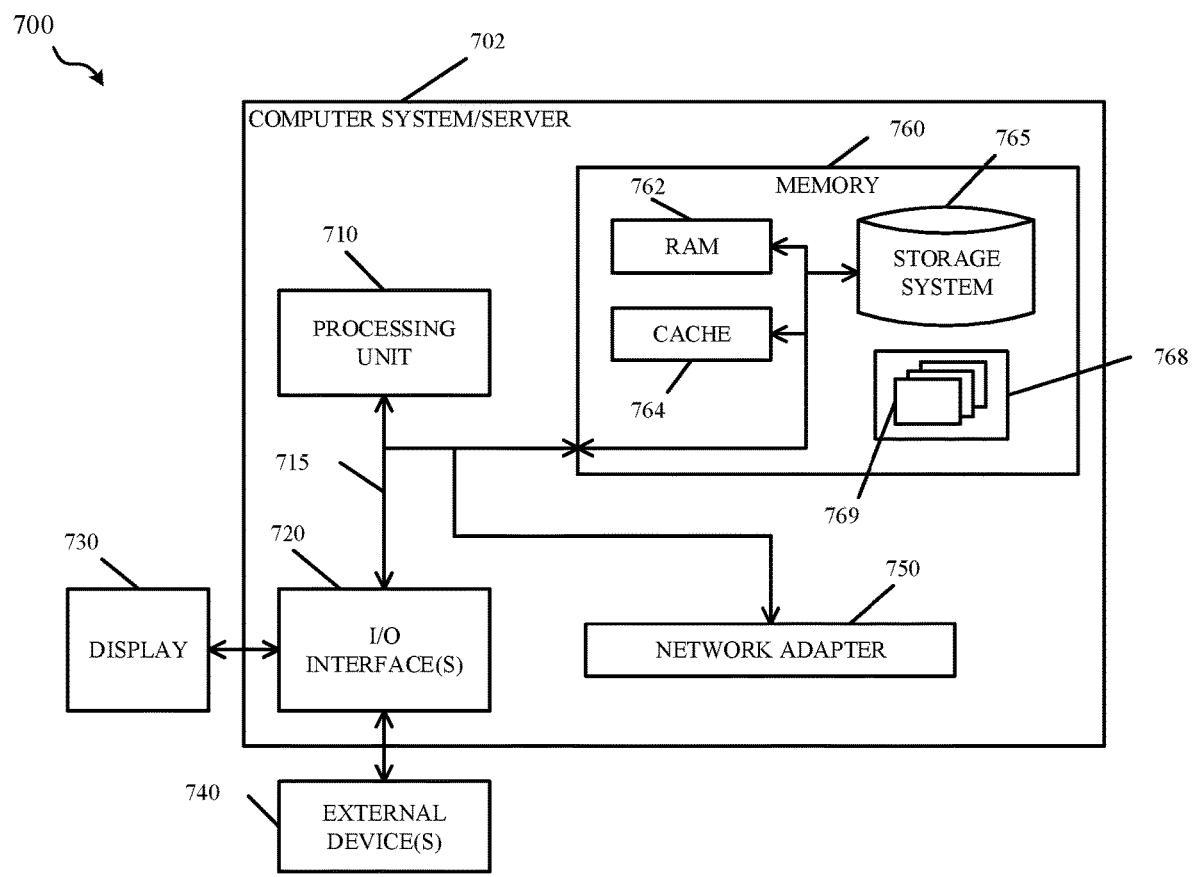
FIG. 7 depicts a block diagram of an example computer system environment, according to some embodiments.

Referring to FIG. 7, computer system 700 is a computer system/server 702 is shown in the form of a general-purpose computing device, according to some embodiments. In some embodiments, computer system/server 702 is located on the linking device. In some embodiments, computer system 702 is connected to the linking device. The components of computer system/server 702 may include, but are not limited to, one or more processors or processing units 710, a system memory 760, and a bus 715 that couples various system components including system memory 760 to processor 710.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 760 can include computer system readable media in the form of volatile memory, such as random-access memory (RAM) 762 and/or cache memory 764. Computer system/server 702 may further include other removable/non-removable, volatile/non-volatile computer system storage media. By way of example only, storage system 765 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces. As will be further depicted and described below, memory 760 may include at least one program product having a set (e.g., at least one) of program modules that are configured to carry out the functions of embodiments of the disclosure.

Program/utility 768, having a set (at least one) of program modules 769, may be stored in memory 760 by way of example, and not limitation, as well as an operating system, one or more application programs, other program modules, and program data. Each of the operating system, one or more application programs, other program modules, and program data or some combination thereof, may include an implementation of a networking environment. Program modules 769 generally carry out the functions and/or methodologies of embodiments of the invention as described herein.

Computer system/server 702 may also communicate with one or more external devices 740 such as a keyboard, a pointing device, a display 730, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 720. Still yet, computer system/server 702 can communicate with one or more networks such as a local area network (LAN), a general wide area network (WAN), and/or a public network (e.g., the Internet) via network adapter 750. As depicted, network adapter 750 communicates with the other components of computer system/server 702 via bus 715. It should be understood that although not shown, other hardware and/or software components could be used in conjunction with computer system/server 702. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 9:
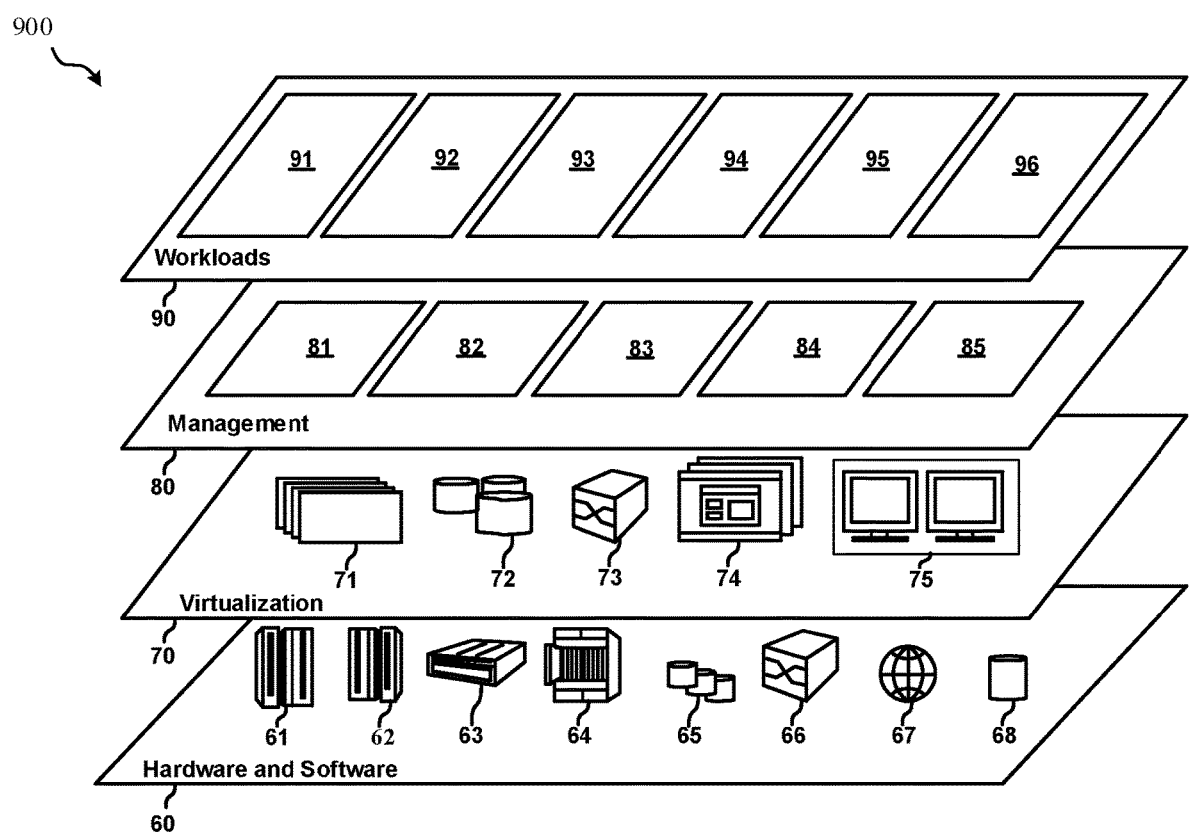
FIG. 9 depicts abstraction model layers, according to some embodiments.

Referring now to FIG. 9, a set of functional abstraction layers 900 provided by cloud computing environment 50 (FIG. 8) is shown, according to some embodiments. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving an image;
   analyzing the image using at least image processing;
   identifying, based on the analyzing, image data and environmental data of the image;
   inputting the image data and the environmental data into a machine learning algorithm, wherein the machine learning algorithm maps relationships between at least the environmental data and selection parameters;
   predicting, using the machine learning algorithm, optimal selection parameters for the image, wherein the optimal selection parameters are selection parameters that best fit the image data and the environmental data for the image; and
   applying the optimal selection parameters to a filtering algorithm for the image.

2. The method of claim 1, further comprising:
   building a machine learning algorithm, wherein the machine learning algorithm is a supervised machine learning model, wherein building the machine learning algorithm comprises:
      receiving cloud environmental data and cloud selection parameters, wherein the cloud environmental data is environmental data that has been previously collected for images similar to the image, and wherein the cloud selection parameters are selection parameters that have been previously collected for the images similar to the image;
      organizing the cloud environmental data and the cloud selection parameters in a structured format;
      mapping the cloud environmental data to the cloud selection parameters; and
      creating, using the cloud environmental data as pre-training data, the machine learning algorithm.

3. The method of claim 2, further comprising:
   training the machine learning algorithm using supervised learning, wherein the machine learning algorithm includes a classifier, and wherein training the machine learning algorithm comprises:
   organizing the environmental data and the image data in a structured format; and
   inputting the environmental data and the image data into the machine learning algorithm as training data.

4. The method of claim 1, wherein the predicted optimal selection parameters comprise one or more of kernel dimensions, kernel values, kernel type, and image scale.

5. The method of claim 1, wherein the filtering algorithm applies a filter to the image, and wherein the filter includes at least one of edge detection, sobel, blur, sharpen, emboss, and reduce Gaussian noise.

6. The method of claim 1, wherein the machine learning algorithm is a supervised machine learning algorithm.

7. The method of claim 1, wherein the machine learning algorithm is an unsupervised version of the machine learning algorithm.

8. The method of claim 1, wherein the machine learning algorithm is a decision tree.

9. The method of claim 8, wherein the decision tree comprises a plurality of decisions corresponding to at least the environmental data of the image.

10. The method of claim 1, wherein the image data comprises at least one of image capture time, image location, and camera type.

11. The method of claim 1, wherein the environmental data comprises at least one of object background, object ratio, image brightness, contrast value, image noise, filter type, and ambient conditions.

12. A system having one or more computer processors, the system configured to:
   receive an image;
   analyze the image using at least image processing;
   identify, based on the analyzing, image data and environmental data of the image;
   input the image data and the environmental data into the machine learning algorithm, wherein the machine learning algorithm maps relationships between at least the environmental data and selection parameters;
   predict, using the machine learning algorithm, optimal selection parameters for the image, wherein the optimal selection parameters are selection parameters that best fit the image data and the environmental data for the image; and
   apply the optimal selection parameters to a filtering algorithm for the image.

13. The system of claim 12, further configured to:
   build a machine learning algorithm, wherein the machine learning algorithm is a supervised machine learning model, and wherein building the machine learning algorithm comprises:
   receiving cloud environmental data and cloud selection parameters, wherein the cloud environmental data is environmental data that has been previously collected for images similar to the image, and wherein the cloud selection parameters are selection parameters that have been previously collected for the images similar to the image;
   organizing the cloud environmental data and the cloud selection parameters in a structured format;
   mapping the cloud environmental data to the cloud selection parameters; and
   creating, using the cloud environmental data as pre-training data, the machine learning algorithm.

14. The system of claim 13, further configured to:
   train the machine learning algorithm using supervised learning, wherein the machine learning algorithm includes a classifier, and wherein training the machine learning algorithm comprises:
   organizing the environmental data and the image data in a structured format; and
   inputting the environmental data and the image data into the machine learning algorithm as training data.

15. The system of claim 12, wherein the predicted optimal selection parameters comprise one or more of kernel dimensions, kernel values, kernel type, and image scale.

16. The system of claim 12, wherein the machine learning algorithm is a decision tree.

17. The system of claim 16, wherein the decision tree comprises a plurality of decisions corresponding to at least the environmental data of the image.

18. A computer program product comprising a computer readable storage medium having program instructions embodied therewith, the program instructions executable by a server to cause the server to perform a method, the method comprising:
   receiving an image;
   analyzing the image using at least image processing;
   identifying, based on the analyzing, image data and environmental data of the image;
   inputting the image data and the environmental data into a machine learning algorithm, wherein the machine learning algorithm maps relationships between at least the environmental data and selection parameters;
   predicting, using the machine learning algorithm, optimal selection parameters for the image, wherein the optimal selection parameters are selection parameters that best fit the image data and the environmental data for the image; and
   applying the optimal selection parameters to a filtering algorithm for the image.

19. The computer program product of claim 18, wherein the method further comprises:
   building a machine learning algorithm, wherein the machine learning algorithm is a supervised machine learning model, wherein building the machine learning algorithm comprises:
   receiving cloud environmental data and cloud selection parameters, wherein the cloud environmental data is environmental data that has been previously collected for images similar to the image, and wherein the cloud selection parameters are selection parameters that have been previously collected for the images similar to the image;
   organizing the cloud environmental data and the cloud selection parameters in a structured format;
   mapping the cloud environmental data to the cloud selection parameters; and
   creating, using the cloud environmental data as pre-training data, the machine learning algorithm.

20. The computer program product of claim 19, wherein the method further comprises:
   training the machine learning algorithm using supervised learning, wherein the machine learning algorithm includes a classifier, and wherein training the machine learning algorithm comprises:
   organizing the environmental data and the image data in a structured format; and inputting the environmental data and the image data into the machine learning algorithm as training data.

\* \* \* \* \*